(No Model.)
W. CALVER.
METHOD OF AND MEANS FOR CONDENSING SOLAR RAYS.
No. 294,117. Patented Feb. 26, 1884.
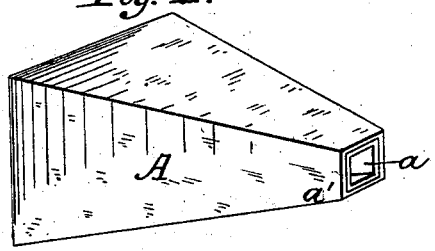
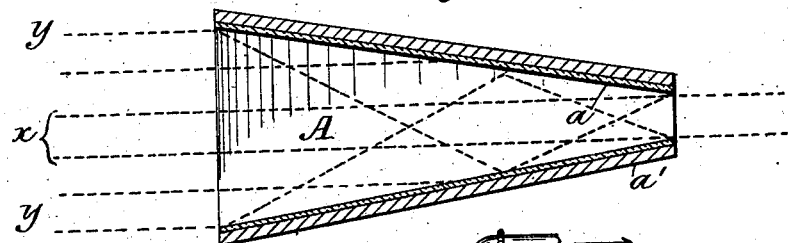
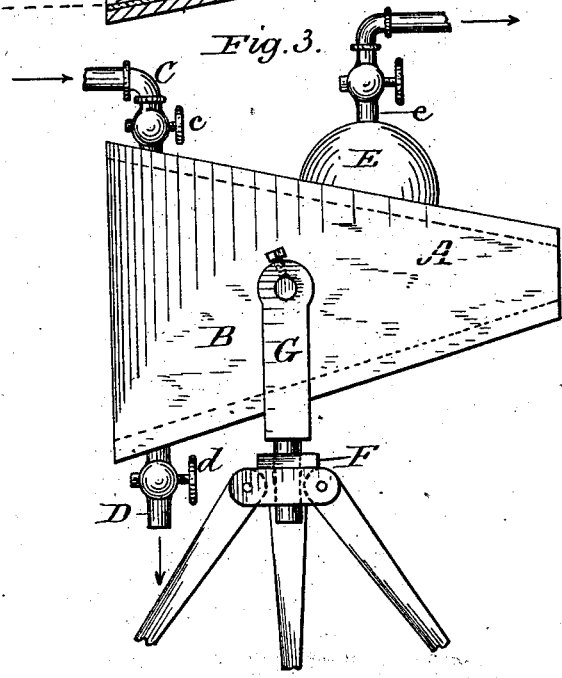
Witnesses:
W. B. Masson
L. C. Hills
Inventor:
William Calver
By E. B. Stocking
Atty.

UNITED STATES PATENT OFFICE.

WILLIAM CALVER, OF WASHINGTON, DISTRICT OF COLUMBIA.

METHOD OF AND MEANS FOR CONDENSING SOLAR RAYS.

SPECIFICATION forming part of Letters Patent No. 294,117, dated February 26, 1884.

Application filed April 25, 1883. (No model.)

*To all whom it may concern:*

Be it known that I, WILLIAM CALVER, a citizen of the United States, residing at Washington, in the District of Columbia, have invented certain new and useful Means for Condensing Solar Rays, of which the following is a specification, reference being had therein to the accompanying drawings, in which—

Figure 1 is a perspective of a solar condenser constructed in accordance with my invention and adapted to practice my method of condensing solar rays. Fig. 2 is a longitudinal vertical section of said condenser. Fig. 3 is a side elevation of my condenser water-jacketed and mounted on a tripod.

Like letters refer to like parts in all the figures.

This invention is intended, primarily, to be used in connection with solar reflectors or heaters of any character, but preferably with such as are shown in my patent of July 4, 1882, although said condenser is also capable of practical use independent of any other apparatus, as will hereinafter appear.

Heretofore all methods of condensing solar rays, either of heat, light, or any other specific character, involved the passage thereof through or against a solid substance as a lens or a reflector. In these methods an actual loss of energy, whether heat, light, or chemical, has been sustained by reason of the interposition of said solid substance. This loss may have been caused by impeding the advancement of the rays or by absorption thereof by the solid substance through or against which they have been made to pass, or from other causes known or unknown I have discovered a method whereby solar rays may be condensed without practical loss of heat, or, in other words, with a manifest clear gain of heat over that produced from an equal column, beam, or body of rays condensed by the old methods so far as applied to the art of controlling solar heat, and in quantity or degree rendering it available for practical purposes. Heretofore scientific experiments with artificial heat have been practiced, wherein the rays have been condensed with a gilded paper cone to demonstrate that said rays were subject to the same laws as those of light. By a "beam, column, or body of rays" I mean a selected, predetermined, separated, or independent collection of the solar rays—as, for instance, a plane mirror presented to the sun reflects nearly all the rays falling thereon. Such rays I consider collectively as a beam, column, or body, and this designation I apply to said rays both before and after their reflection. Heretofore in the art of utilizing solar rays all the rays of a column or beam have been passed through or against a solid, and practically all of said rays have been diverted from a straight line, so that not only has obstruction increased the loss of energy, but deviation from a straight line of advancement has added to the loss. In all reflectors a percentage, more or less great, of loss is from absorption, and deviation from a straight line, as by reflection or refraction, seems to be a potent agent of such absorption; therefore, to obtain the greatest energy of a beam or column, obstruction and deviation must be reduced to the minimum.

I have devised several forms of condensers which are adapted to practice my method, and have herein described one form which, as shown in Fig. 1 at A, is in outline a frustum of a pyramid, the inclination of the sides of which relative to its axis is limited by one requisite only—that is, to such an angle that no material portion of the beam of rays entering at the base shall be reflected backward. The material and mechanical proportions and construction of my condenser may be varied to suit the specific character of the rays of the sun to be condensed, whether of heat, light, actinic, or other rays thereof. In this instance I illustrate a condenser adapted to operate upon the heat-rays primarily, but also adapted for use in connection with the light and other rays, and either in connection with or independently of suitable reflectors. The inner surfaces, $a$, are constructed of glass, or it may be any suitable reflecting material, and the outer surface, $a'$, is in this instance of wood, to serve as a backing and protection to the glass. If desired, the outline may be that of a frustum of a cone, or may be composed of numerous plane surfaces or sides, instead of four, as shown.

The operation of the condenser is as follows: A beam or column, $y\,x\,y$, of solar rays being received or directed into the condenser in the direction indicated by the arrows, the central rays, x, of the beam or column proceed in straight lines and unobstructed, while the outer rays, y y, are directed by the flaring walls of the condenser into or toward the central rays, and thus the heat or other energy thereof is confined, condensed, increased, or accumulated in the reduced beam emerging from the condenser.

It will be noticed that the extreme outer rays of the column or beam are twice reflected within the condenser ere they emerge, and I find by practice that this is a satisfactory limit to the number of reflections which may occur by reason of the length and relative inclination of the walls of the condenser; but I do not limit myself to any specific proportionate length, or any specific number of reflections resulting therefrom.

As before stated, each reflection adds to the absorption of the heat-rays or the conversion of light into heat, and I therefore illustrate in Fig. 3 a condenser provided with a water-jacket, B, having an inlet, C, and outlet D, provided with controlling-valves c d, respectively, so that a continual stream of water (or, if desired, air) may be kept in circulation about the condenser, and thus cool the walls thereof and prevent undue absorption of heat; or by retaining a body of water about the condenser it may be converted into steam, be collected and stored in the steam-dome E, and conducted through the pipe e for application to practical uses.

To render the condenser and jacket portable and adjustable for varied presentation to the sun or to reflectors, I mount the same upon a tripod, F, and swivel-bracket G. Suitable accessories may be provided for the use of the heated air or the steam emerging from the jacket at the same time that the main beam or column of rays is being applied to practical purposes; but as these are within the province of mechanical skill they are not herein shown.

Having described my invention and its operation, what I claim is—

1. A condenser for solar rays, comprising a frustum of a pyramid, or its described equivalent, the length of the same and the inclination of its walls with its axis being relatively determined to advance the rays entering at its base, and to deliver them from its apex in a smaller column or beam, the whole constructed so as to withstand high degrees of heat, substantially as specified.

2. A solar condenser comprising a hollow frustum and a surrounding water-space provided with an inlet, an outlet, and a steam-outlet, each provided with controlling-valves, substantially as specified.

3. A solar condenser comprising a frustum of a pyramid, or its described equivalent, having inner reflecting walls or surfaces, a, and an outer re-enforcing and protecting backing, a', substantially as shown.

4. The combination of the condenser A, swivel-bracket G, and tripod F, substantially as shown and described.

5. The combination of the condenser A, jacket B, steam-dome E, inlet C, and outlets D e, substantially as shown and described.

In testimony whereof I affix my signature in presence of two witnesses.

WILLIAM CALVER.

Witnesses:
E. B. STOCKING,
N. P. CALLAN.